Patented Aug. 25, 1942

2,293,811

UNITED STATES PATENT OFFICE 2,293,811

PREPARATION OF THERAPEUTICALLY USEFUL HETEROCYCLIC COMPOUNDS

Arthur James Ewins, Gidea Park, Romford, and Montague Alexander Phillips, Romford, England, assignors to May & Baker Limited, Dagenham, Essex, England, a company of Great Britain No Drawing. Application June 11, 1940. Serial No. 339,888. In Great Britain June 20, 1939

5 Claims. (Cl. 260—288)

In the specification of application Serial No. 238,164 we have described various methods of preparing p-amino-benzene-sulphonamido derivatives of pyridine, quinoline and isoquinoline by the condensation of benzenesulphon halides or amides, substituted in the para position by groups which can be converted into amino groups, with suitably substituted pyridine, quinoline and isoquinoline compounds. We have now found that similar compounds may be prepared by the direct condensation of p-amino-benzene-sulphonamide on a halogen substituted pyridine or quinoline compound.

The present invention therefore has for its object the preparation of therapeutically useful p-amino-benzene-sulphonamido derivatives of pyridine and quinoline.

These compounds may be prepared by the condensation of p-amino-benzene-sulphonamide with a pyridine or quinoline compound containing as a substituent a reactive halogen atom.

The following examples illustrate but in no way limit the application of the method.

Example 1

A mixture of 5.2 grams of 2-bromo-quinoline, 4.3 grams of p-amino-benzene-sulphonamide, 3.5 grams of potassium carbonate (anhydrous) and 0.05 gram of copper powder is heated at 180° C. for 1½ hours. The melt is extracted with boiling water to which a few cc. of dilute caustic soda solution have been added, and the extract acidified with acetic acid. The precipitated solid is filtered off, washed with water, and boiled for 10 minutes with twelve times its weight of 2N sodium hydroxide solution. After cooling, the precipitated sodium salt is dissolved in 50 cc. of boiling water, reprecipitated by the addition of acetic acid and recrystallised from 50% acetic acid. In this way 2(p-amino-benzene sulphonamido)-quinoline, M. Pt. 193–5° C. is obtained.

Example 2

A mixture of 4.0 grams of 2-bromo-pyridine, 4.3 grams of p-amino-benzene-sulphonamide, 3.6 grams of anhydrous potassium carbonate and 0.05 gram of copper powder is heated at 180° C. for 2 hours. The melt is dissolved in 40 cc. of boiling water and, after filtering and extracting with chloroform to remove resinous impurities, is acidified with dilute acetic acid. The precipitate is filtered off, washed with water and dried. After recrystallisation from acetone, 2(p-aminobenzene-sulphonamido)-pyridine, M. Pt. 189° C. is obtained. The product is identical with that obtained by alkaline hydrolysis of 2(p-acetylamino-benzene-sulphonamido)-pyridine obtained by the interaction of 2-amino-pyridine and p-acetyl-amino-benzene-sulphonyl chloride.

Example 3

A mixture of 5.2 grams of 2-iodo-pyridine, 4.3 grams of p-aminobenzene-sulphonamide, 3.6 grams of anhydrous potassium carbonate, and 0.05 gram of copper powder is heated at 150° C. for 1 hour. The melt is dissolved in 50 cc. of hot water, filtered and acidified with dilute acetic acid, when 2(p-aminobenzene-sulphonamido)-pyridine is obtained. Crystallised as above it melts at 190° C.

Example 4

A mixture of 5-nitro-2-chloro-pyridine (8.0 grams), p-aminobenzene-sulphonamide (8.6 grams), anhydrous potassium carbonate (7.0 grams) and copper powder (0.05 gram) is heated at 140° C. for 30 minutes. The mixture is then dissolved in boiling N/1 sodium hydroxide solution and acidified, after filtration, with dilute acetic acid. The crude product is purified by crystallisation from 50% acetic acid; in this way 5-nitro-2-(p-aminobenzene-sulphonamido)-pyridine, M. Pt. 218–220° C. is obtained.

What we claim and desire to secure by Letters Patent is:

1. Process for the manufacture of compounds of the class consisting of p-aminobenzene-sulphonamido derivatives of pyridine and quinoline, in which a carbon atom of the heterocyclic nucleus is linked to the sulfonamido nitrogen by the condensation of p-aminobenzene-sulphonamide with a member of the group consisting of pyridine and quinoline containing a reactive halogen substituent attached to a carbon atom of the nucleus of that member in the presence of potassium carbonate and copper.

2. Process for the manufacture of compounds of the class consisting of p-aminobenzene-sulphonamido derivatives of pyridine and quinoline in which a carbon atom of the heterocyclic nucleus is linked to the sulfonamido nitrogen, by the condensation of p-aminobenzene-sulphonamide with a member of the group consisting of 2-halogeno-pyridine and 2-halogeno-quinoline in the presence of potassium carbonate and copper.

3. Process for the manufacture of compounds of the class consisting of p-aminobenzene-sulphonamido derivatives of pyridine and quinoline, in which a carbon atom of the heretocyclic nucleus is linked to the sulfonamido nitrogen by the condensation of p-aminobenzene-sulphonamide with a member of the group consisting of 2-chloro-pyridine and 2-chloro-quinoline in the presence of potassium carbonate and copper.

4. Process for the manufacture of compounds of the class consisting of p-aminobenzene-sulphonamido derivatives of pyridine and quinoline, in which a carbon atom of the heterocyclic nucleus is linked to the sulfonamido nitrogen by the condensation of p-aminobenzene-sulphonamide with a member of the group consisting of 2-bromo-pyridine and 2-bromo-quinoline in the presence of potassium carbonate and copper.

5. Process for the manufacture of compounds of the class consisting of p-aminobenzene-sulphonamido derivatives of pyridine and quinoline, in which a carbon atom of the heterocyclic nucleus is linked to the sulfonamido nitrogen by the condensation of p-aminobenzene-sulphonamide with a member of the group consisting of 2-iodo-pyridine and 2-iodo-quinoline in the presence of potassium carbonate and copper.

ARTHUR JAMES EWINS.
MONTAGUE ALEXANDER PHILLIPS.